US012102274B1

(12) United States Patent
Bickerstaff

(10) Patent No.: US 12,102,274 B1
(45) Date of Patent: Oct. 1, 2024

(54) WEARABLE HAND SANITIZER DISPENSER

(71) Applicant: David Bickerstaff, Menlo Park, CA (US)

(72) Inventor: David Bickerstaff, Menlo Park, CA (US)

( * ) Notice: Subject to any disclaimer, the term of this patent is extended or adjusted under 35 U.S.C. 154(b) by 0 days.

(21) Appl. No.: 17/692,410

(22) Filed: Mar. 11, 2022

Related U.S. Application Data

(60) Provisional application No. 63/159,633, filed on Mar. 11, 2021.

(51) Int. Cl.
*A47K 5/12* (2006.01)
*A44C 5/00* (2006.01)
*H01H 3/02* (2006.01)

(52) U.S. Cl.
CPC ............ *A47K 5/1201* (2013.01); *A44C 5/003* (2013.01); *H01H 2003/0293* (2013.01)

(58) Field of Classification Search
CPC ......... A61M 35/003; H01H 2003/0293; B05B 11/0038; B05B 11/0054; B05B 11/0056; A47K 5/1201; F41H 9/10
See application file for complete search history.

(56) References Cited

U.S. PATENT DOCUMENTS 4,241,850 A 12/1980 Speer
5,088,624 A 2/1992 Hackett et al.
5,358,144 A 10/1994 Mock
5,484,085 A 1/1996 Bennett
5,516,005 A 5/1996 Moseley
5,678,730 A 10/1997 Fabek et al.
5,924,601 A 7/1999 Chen
6,223,744 B1 * 5/2001 Garon .................. A61M 15/00 128/200.14
7,135,011 B2 11/2006 Powers et al.
7,316,332 B2 1/2008 Powers et al.
D780,613 S * 3/2017 Shaukat .......................... D11/2
9,888,816 B1 * 2/2018 Shaukat ............... A47K 5/1204
10,028,624 B1 * 7/2018 Robinson ............. A47K 5/1202
10,124,127 B2 * 11/2018 Baldwin ........... A61M 15/0043
10,799,660 B2 * 10/2020 Klurfeld ................ A61M 11/00
11,096,528 B2 * 8/2021 Chacon, Jr. .......... A44C 5/0007
(Continued)

FOREIGN PATENT DOCUMENTS

WO WO2000054828 9/2000

*Primary Examiner* — Paul R Durand
*Assistant Examiner* — Randall A Gruby
(74) *Attorney, Agent, or Firm* — John Rizvi; John Rizvi, P.A.—The Patent Professor®

(57) ABSTRACT

A wearable hand sanitizer dispenser may be worn on a wrist of a wearer and selectively actuated to discreetly dispense liquid hand sanitizer onto a palm of the wearer's hand. The wearable hand sanitizer may include a dispenser housing configured to contain a supply of liquid hand sanitizer. The dispenser housing may be configured for attachment to the wrist. At least one sanitizer dispensing nozzle may be in fluid communication with the dispenser housing interior and may extend from the dispenser housing in positional alignment with the wearer's palm. Accordingly, the liquid hand sanitizer can be selectively and discreetly dispensed from the dispenser housing through the sanitizer dispensing nozzle onto the palm of the hand. The wearer may rub the hands together to spread the dispensed liquid hand sanitizer over the hands to sanitize the hands.

17 Claims, 15 Drawing Sheets

(56) References Cited

U.S. PATENT DOCUMENTS

| | | | | |
|---|---|---|---|---|
| 11,176,802 | B1 * | 11/2021 | Robinson | G06F 1/163 |
| 11,304,570 | B1 * | 4/2022 | Shaukat | A47K 5/1217 |
| 11,573,067 | B1 * | 2/2023 | Faircloth, Jr. | F41H 9/10 |
| 11,700,920 | B2 * | 7/2023 | Chacon, Jr. | A47K 5/1202 222/175 |
| 11,717,063 | B1 * | 8/2023 | Demirjian | A44C 15/002 222/175 |
| D1,011,947 | S * | 1/2024 | Faircloth, Jr. | D11/2 |
| 2006/0078484 | A1 | 4/2006 | Greep | |
| 2008/0251539 | A1 * | 10/2008 | Yapaola | A47K 5/10 222/175 |
| 2015/0076201 | A1 * | 3/2015 | Young | H04B 1/3888 224/576 |
| 2017/0122708 | A1 | 5/2017 | Gorinas et al. | |
| 2017/0216519 | A1 * | 8/2017 | Vouillamoz | G04B 37/127 |
| 2021/0289992 | A1 * | 9/2021 | Saladino | A44C 15/002 |
| 2021/0393814 | A1 * | 12/2021 | Klepfisz | A61L 2/0088 |
| 2022/0338681 | A1 * | 10/2022 | Barnes | A47K 5/1204 |

* cited by examiner

WEARABLE HAND SANITIZER DISPENSER

CROSS-REFERENCE TO RELATED APPLICATIONS

This application claims the benefit of U.S. Provisional Patent Application No. 63/159,633, filed on Mar. 11, 2021, which is incorporated by reference herein in its entirety.

FIELD OF THE INVENTION

The present invention relates generally to hand sanitizers, and more particularly, to a wearable hand sanitizer dispenser which can be worn on the wrist of a wearer and selectively actuated to discreetly dispense liquid hand sanitizer onto the palm of the wearer.

BACKGROUND OF THE INVENTION

Communicable diseases are illnesses which are caused by viruses, bacteria, fungi, or other microorganisms that are typically spread from one person to one another. Communicable diseases may be transmitted through contact with such media as contaminated surfaces, bodily fluids, blood products, insect bites and air.

Over 200 infectious diseases are listed in the Control of Communicable Diseases Manual published by the APHA (American Public Health Association). Examples of communicable diseases include HIV, hepatitis, measles, *salmonella* and bloodborne illnesses.

Preventing and controlling the spread of communicable diseases is at the heart of much public health work. From the coronavirus-cased COVID-19 to influenza, Lyme disease malaria and Ebola, outbreaks of infectious diseases can have an extraordinary impact on human health.

There are many ways to prevent the spread of communicable diseases. Vaccinations have helped eliminate or greatly reduced disease threats. Children, teenagers, and adults should all be protected and stay up to date with their recommended immunizations. Proper handwashing, especially before and after handling food and using restroom facilities, helps keep germs at bay. Other important ways to slow or stop disease transmission are by ensuring the food we eat and water we drink is safe, avoiding people who are sick and practicing safe sex.

The COVID-19 pandemic is an ongoing global pandemic of the novel coronavirus (COVID-19). COVID-19 was first identified in December 2019 in Wuhan, China and is caused by the severe acute respiratory syndrome coronavirus 2 (SARS-CoV-2). As of Mar. 1, 2022, over 437 million cases of COVID-19, resulting in over 5.96 million deaths, have been reported worldwide. Over 369 million of those who have been infected worldwide have recovered.

The coronavirus 2 can be transmitted through small droplets produced from the nose and mouth by coughing, sneezing, and talking. Persons who stand close to an infected person who has produced these droplets may inhale the droplets and become infected. Other means of transmittal may include one's touching a contaminated surface and then his or her face. In some cases, small droplets may remain suspended in the air in enclosed spaces.

The coronavirus 2 is most contagious during the first three days after the onset of symptoms. In some cases, transmission of the virus may be possible before symptoms appear. Transmission from those who do not show symptoms may also be possible.

Common symptoms of COVID-19 may include fever, cough, fatigue, shortness of breath and loss of the senses of taste and smell. Complications of COVID-19 may include pneumonia and acute respiratory distress syndrome. The incubation period, or time from exposure to onset of symptoms, is typically around five days but may range from two to fourteen days. Vaccines to COVID-19 have been developed.

Preventative measures for COVID-19 include hand washing, covering the mouth when coughing, social distancing, wearing a facemask in public, disinfecting surfaces, increasing indoor ventilation and air filtration, and quarantining those who are suspected to be infected.

Since the advent of the virus, authorities around the world have implemented travel restrictions, lockdowns and workplace restrictions and closures in an effort to retard spread of the disease. In some places, trace contacting has been used to identify and monitor infected persons.

The restrictions which have been implemented because of COVID-19 have caused considerable economic disruption. Measures put into place to prevent or limit the spread of the disease has led to the postponement or cancellation of sporting, religious, political, and cultural events. Other results have included widespread supply shortages exacerbated by panic buying.

Accordingly, there is an established need for a wearable hand sanitizer dispenser which can be worn on the wrist of a wearer and selectively actuated to discreetly dispense liquid hand sanitizer onto the palm of the wearer.

SUMMARY OF THE INVENTION

The present invention is directed to a wearable hand sanitizer dispenser which can be worn on the wrist of a wearer and selectively actuated to discreetly dispense liquid hand sanitizer onto the palm on the hand of the wearer. The wearable hand sanitizer may include a dispenser housing. The dispenser housing may be suitably configured to contain a supply of liquid hand sanitizer. The dispenser housing may be configured for attachment to the wrist of a wearer. At least one sanitizer dispensing nozzle may extend from the dispenser housing. The sanitizer dispensing nozzle may be disposable in fluid communication with the liquid hand sanitizer in the dispenser housing and in positional alignment with the palm on the hand of the wearer. Accordingly, the liquid hand sanitizer can be selectively and discreetly dispensed from the dispenser housing through the sanitizer dispensing nozzle onto the palm of the hand. The wearer may rub the hands together to spread the dispensed liquid hand sanitizer over the hands to sanitize the hands.

In an illustrative implementation of the invention, a wearable hand sanitizer dispenser which can be worn on the wrist of a wearer and selectively actuated to discreetly dispense liquid hand sanitizer onto the palm of the wearer may include a dispenser housing. The liquid hand sanitizer may be contained in at least one sanitizer cartridge. The dispenser housing may have an interior cartridge compartment. The cartridge compartment may be configured to contain the sanitizer cartridge. The dispenser housing may be configured for attachment to the wrist of the wearer. The sanitizer dispensing nozzle may be disposable in positional alignment with the palm on the hand of the wearer as the dispenser housing is attached to the wearer's wrist.

At least one sanitizer dispensing nozzle may extend from the dispenser housing. As it is placed in the cartridge compartment, the sanitizer cartridge may be disposable in fluid communication with the sanitizer dispensing nozzle.

Accordingly, the liquid hand sanitizer can be selectively and discreetly dispensed from the sanitizer cartridge in the dispenser housing through the sanitizer dispensing nozzle onto the palm of the hand. The wearer may then rub the hands together to spread the dispensed liquid hand sanitizer over the hands to sanitize the hands.

In another aspect, at least one securing device may be configured to secure the dispenser housing on the wrist of the wearer.

In another aspect, a pair of spaced-apart securing device connectors may extend from the dispenser housing, and the securing device may extend from the securing device connectors.

In another aspect, the securing device may include at least one securing strap or band.

In another aspect, the securing device may include a first securing strap and a second securing strap releasably securable to the first securing strap.

In another aspect, a plurality of strap openings may extend through the first securing strap and a strap tab may extend from the second securing strap, and the strap tab may be configured for insertion into a selected one of the strap openings.

In another aspect, a strap ring may terminate the first securing strap, and the second securing strap may be configured for extension through the strap ring.

In another aspect, the first securing strap and the second securing strap may be attached to the securing device connectors, respectively.

In another aspect, the dispenser may be characterized in that the pair of spaced-apart securing device connectors extending from the dispenser housing further comprise a first securing device connector and a second securing device connector; the pair of side housing walls further comprises a first side housing wall and a second side housing wall; the first securing device connector and the second securing device connector respectively extend from the first side housing wall and the second side housing wall; and the at least one securing device comprises a first securing device attached to the first securing device connector and a second securing device attached to the second securing device connector.

In one aspect, the wearable hand sanitizer dispenser may comprise a strap clamp located at distal end of the second securing strap configured to secure the first securing strap and the second securing strap together to hold the wearable hand sanitizer on a wearer's wrist.

In another aspect, at least one sanitizer dispensing button may be provided on the dispenser housing to dispense the liquid hand sanitizer from the sanitizer cartridge through the sanitizer dispensing nozzle.

In another aspect, the sanitizer cartridge may be disposable.

In another aspect, the sanitizer cartridge may be refillable or recyclable.

In another aspect, the sanitizer dispensing button may include a head portion and an actuating portion extending from the head portion, and the actuating portion may be configured to engage the sanitizer cartridge to eject the liquid hand sanitizer from the sanitizer cartridge.

In another aspect, the head portion of the sanitizer dispensing button may be disposed in a button opening in the dispenser housing.

In another aspect, at least one cartridge support pedestal may be provided in the cartridge compartment of the dispenser housing, and the sanitizer cartridge may be supported by the cartridge support pedestal.

In another aspect, the dispenser housing may include a front housing wall and a rear housing wall and a pair of side housing walls, a top housing wall and a bottom housing wall extending between the front housing wall and the rear housing wall.

In another aspect, the sanitizer dispensing nozzle may extend from the front housing wall of the dispenser housing.

In another aspect, the button opening may be provided in the top housing wall of the dispenser housing.

In another aspect, the securing device connectors may extend from the side housing walls, respectively, of the dispenser housing.

In another aspect, the sanitizer cartridge may be disposable and removably placed in the cartridge compartment of the dispenser housing.

In another aspect, at least one cartridge access opening may be provided in the dispenser housing, and the sanitizer cartridge may be placed in the cartridge compartment through the cartridge access opening.

In another aspect, a cover may be provided on the dispenser housing and configured to selectively close the cartridge access opening.

In another aspect, at least one lamp may be provided on the dispenser housing to facilitate illumination of the palm on the hand of the wearer.

In another aspect, the wearable hand sanitizer dispenser may include a battery power source, and the at least one sanitizer dispensing button may be located on a battery-operated touch screen provided on the top housing wall of the dispenser housing.

In another aspect, the wearable hand sanitizer dispenser may include a battery level indicator LED lamp located on the dispenser housing, and a cartridge level indicator LED lamp located on the dispenser housing.

In another aspect, the battery power source may be a rechargeable battery located in the dispenser housing.

In another aspect, the wearable hand sanitizer dispenser may include a USB port operably connected to the rechargeable battery.

In another aspect, the USB port may be located at the rear housing wall of the dispenser housing.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Shown throughout the figures, the present invention is directed toward a wearable hand sanitizer dispenser which can be worn on the wrist of a wearer and selectively actuated to discreetly dispense liquid hand sanitizer onto the palm on the hand of the wearer.

Figure 1:
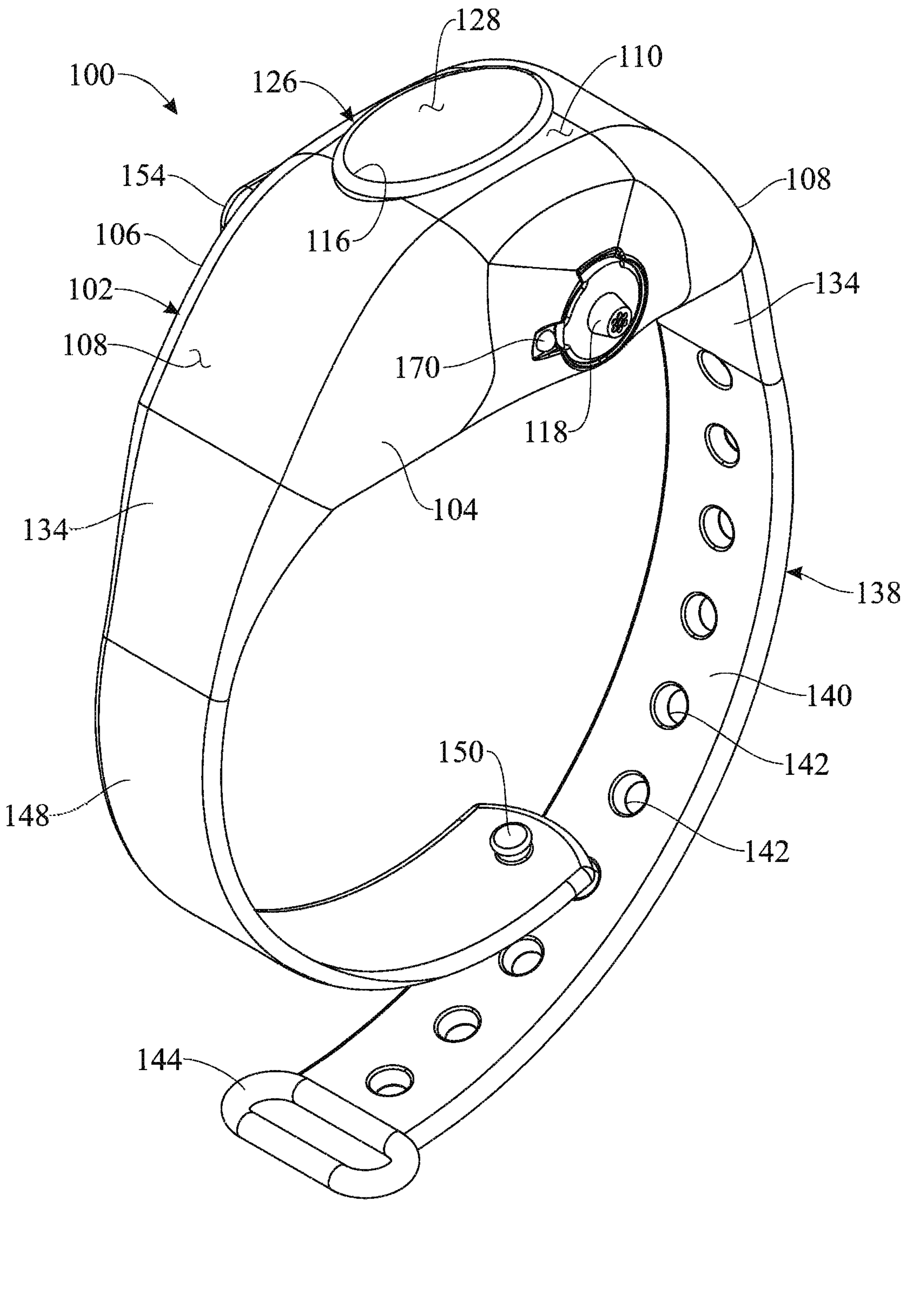
FIG. 1 presents a front perspective view of a wearable hand sanitizer dispenser in accordance with a first illustrative embodiment of the present invention, with the securing device disposed in an unfastened configuration.
Figure 2:
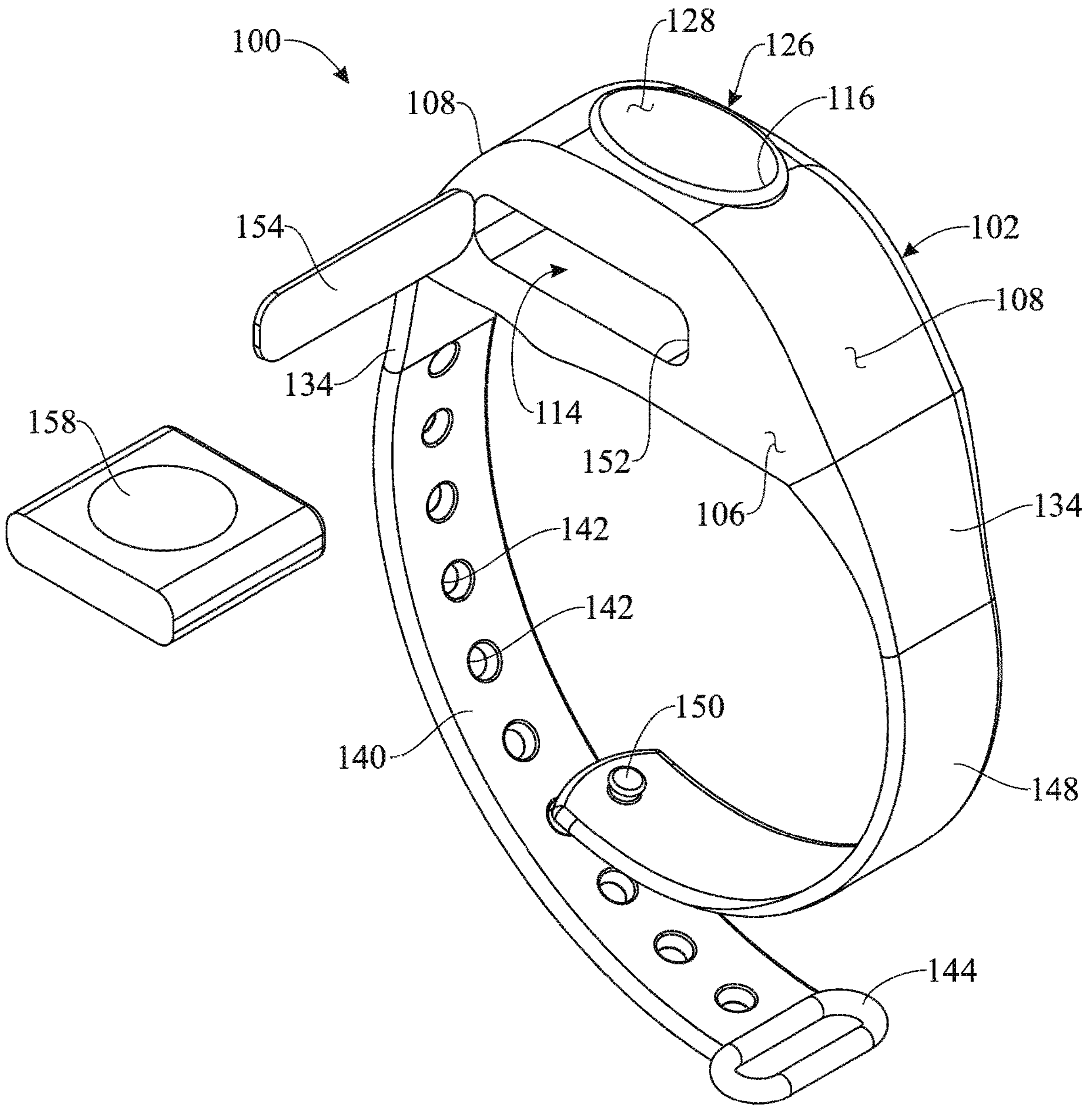
FIG. 2 presents an exploded rear perspective view of the wearable hand sanitizer dispenser illustrated in FIG. 1, with the cover open to expose the cartridge recess opening and the sanitizer cartridge outside the cartridge compartment.
Figure 3:
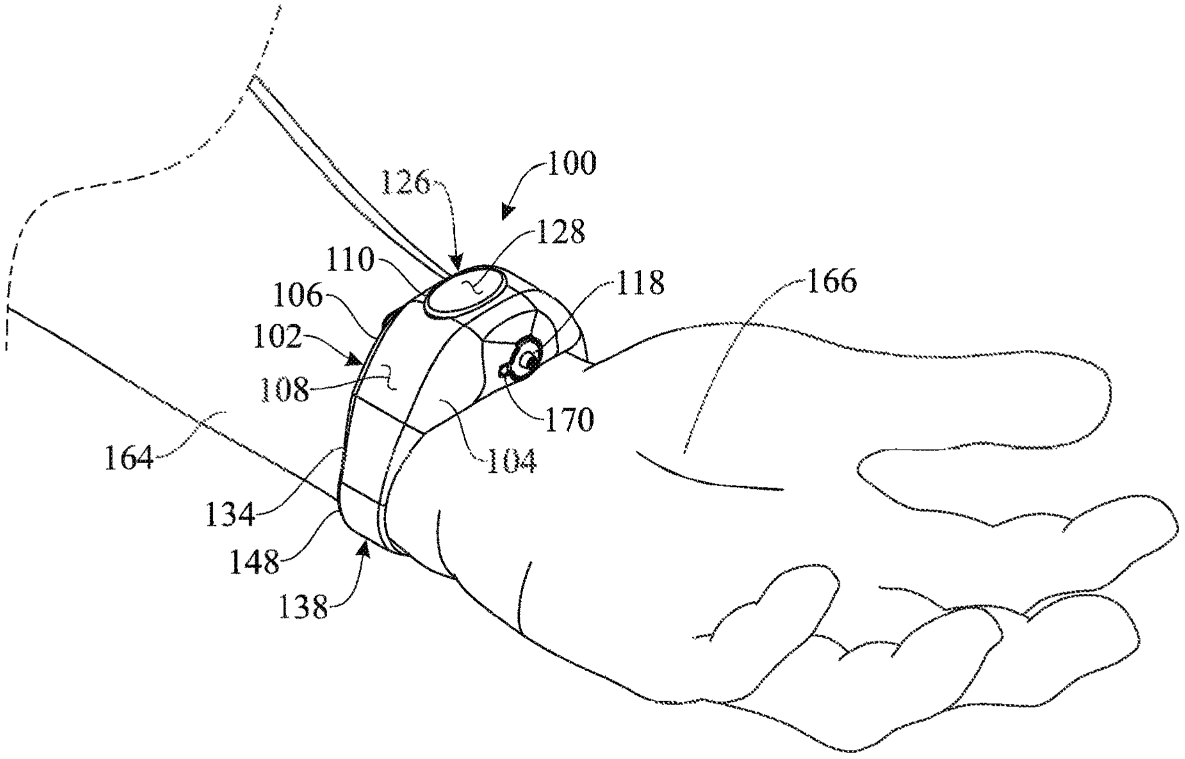
FIG. 3 presents a front perspective view of the wearable hand sanitizer dispenser, fastened on the wrist of a wearer in typical application of the dispenser.
Figure 4:
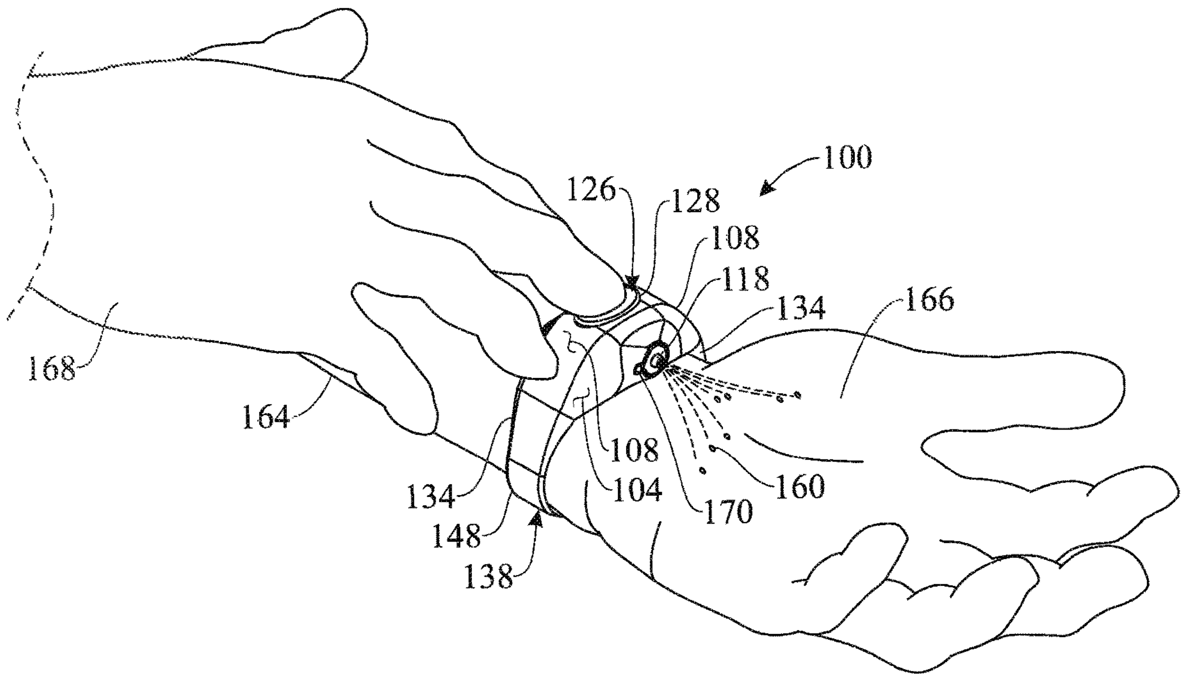
FIG. 4 presents a front perspective view of the wearable hand sanitizer dispenser fastened on the wrist of a wearer in typical application of the dispenser and further illustrating typical dispensing of the liquid hand sanitizer from the sanitizer dispensing nozzle.
Figure 5:
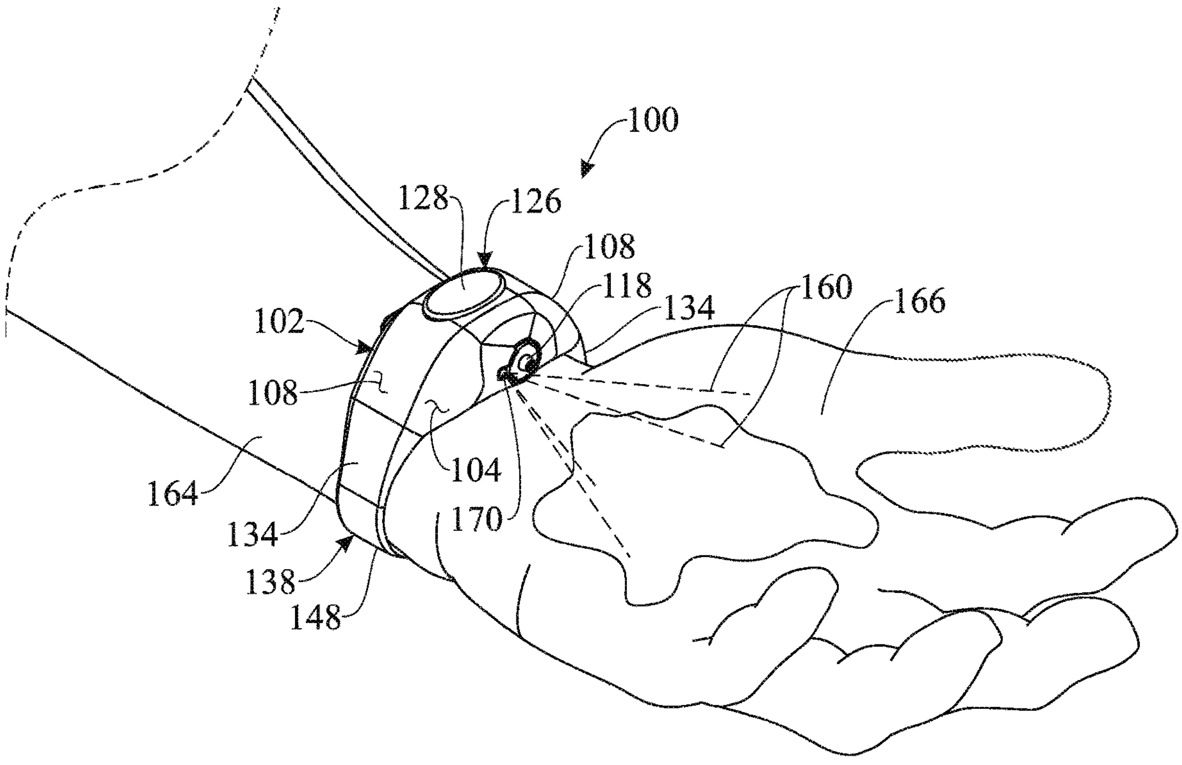
FIG. 5 presents a front perspective view of the wearable hand sanitizer dispenser illustrated in FIG. 4, further illustrating illumination of the liquid hand sanitizer dispensed onto the palm of the wearer by actuation of the lamp.
Figure 6:
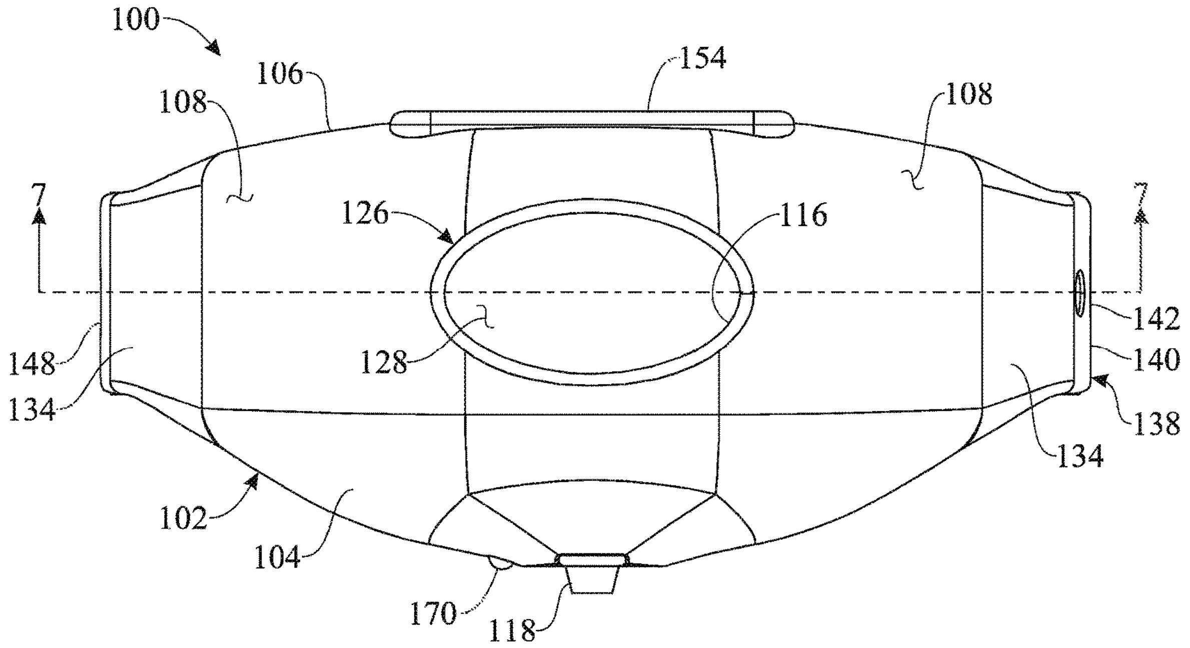
FIG. 6 presents a top view of the illustrative wearable hand sanitizer dispenser.

Referring initially to FIGS. 1-7, a wearable hand sanitizer dispenser, hereinafter sanitizer dispenser 100, is illustrated in accordance with an exemplary embodiment of the present invention. As shown for instance in FIG. 1, the sanitizer dispenser 100 may include a dispenser housing 102. The dispenser housing 102 may be configured to contain a supply of liquid hand sanitizer 160 (FIG. 5). As illustrated in FIG. 3, the dispenser housing 102 may be configured for attachment to the wrist 164 of a wearer. At least one sanitizer dispensing nozzle 118 may extend from the dispenser housing 102. The sanitizer dispensing nozzle 118 may be disposable in fluid communication with the liquid hand sanitizer 160 in the dispenser housing 102 and in positional alignment with the palm 166 on the hand of the wearer. Accordingly, the liquid hand sanitizer 160 can be selectively and discreetly dispensed from the dispenser housing 102 through the sanitizer dispensing nozzle 118 onto the palm 166 of the hand. The wearer may then rub the hands together to spread the dispensed liquid hand sanitizer 160 over the hands to sanitize the hands.

Figure 7:
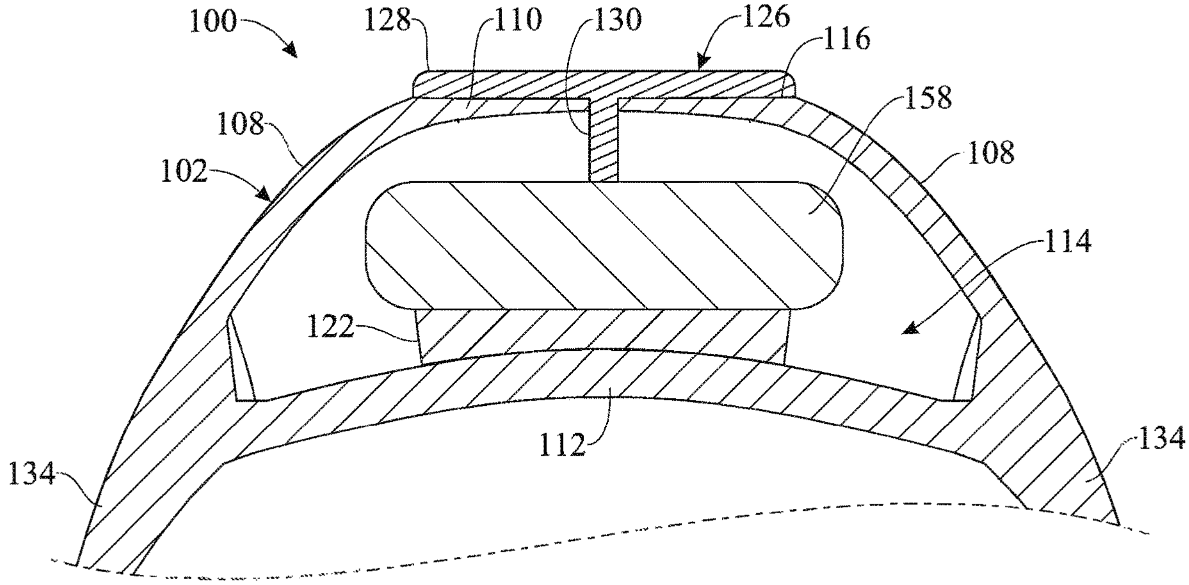
FIG. 7 is a cross-sectional side elevation view of the wearable hand sanitizer dispenser illustrated in FIG. 6, taken along section lines 7-7 in FIG. 6.

As illustrated in FIG. 7, in some embodiments, the liquid hand sanitizer 160 (FIG. 5) may be contained in at least one sanitizer cartridge 158. A cartridge compartment 114 may be provided in the dispenser housing 102. The cartridge compartment 114 may be configured to contain the sanitizer cartridge 158. The sanitizer cartridge 158 may be configured to be placed in fluid communication with the sanitizer dispensing nozzle 118 as the sanitizer cartridge 158 is placed in the cartridge compartment 114.

At least one securing device 138 may be configured to secure the dispenser housing 102 on the wrist 164 of the wearer. A pair of spaced-apart securing device connectors 134 may extend from the dispenser housing 102, and the securing device 138 may extend from the securing device connectors 134.

The securing device 138 may include any device, mechanism or combination or devices or mechanisms which may facilitate fastening or securing of the dispenser housing 102 on the wrist 164, and may be fabricated in various sizes. For example and without limitation, in some embodiments, the securing device 138 may include at least one securing strap or band. Accordingly, as illustrated in FIGS. 1 and 2, the securing device 138 may include a first securing strap 140 and a second securing strap 148. The first securing strap 140 and the second securing strap 148 may be attached to the respective securing device connectors 134 which extend from the dispenser housing 102.

The second securing strap 148 may be releasably securable to the first securing strap 140 according to the knowledge of those skilled in the art. In some embodiments, a plurality of spaced-apart strap openings 142 may extend through the first securing strap 140. A strap ring 144 may be provided on the first securing strap 140. A strap tab 150 may extend from the second securing strap 148. Accordingly, the second securing strap 148 may be inserted through the strap ring 144 on the first securing strap 140. The strap tab 150 may then be inserted through a selected one of the strap openings 142 to secure the first securing strap 140 and the second securing strap 148 around the wrist 164 of the wearer.

In some embodiments, at least one sanitizer dispensing button 126 may be provided on the dispenser housing 102. The sanitizer dispensing button 126 may be configured to dispense the liquid hand sanitizer 160 from the sanitizer cartridge 158 through the sanitizer dispensing nozzle 118, typically in a manner which will be hereinafter described.

As illustrated in FIG. 7, in some embodiments, the sanitizer dispensing button 126 may include a head portion 128. An actuating portion 130 may extend from the head portion 128. The actuating portion 130 may be configured to engage the sanitizer cartridge 158 to eject the liquid hand sanitizer 160 from the sanitizer cartridge 158 typically by manual depression of the head portion 128, as illustrated in FIG. 4.

As further illustrated in FIG. 7, in some embodiments, the head portion 128 of the sanitizer dispensing button 126 may be disposed in a button opening 116 in the dispenser housing 102. At least one cartridge support pedestal 122 may be provided in the cartridge compartment 114 of the dispenser housing 102 beneath the activating portion 130 of the sanitizer dispensing button 126. In placement of the sanitizer cartridge 158 in the cartridge compartment 114, the sanitizer cartridge 158 may be supported by the cartridge support pedestal 122.

The sanitizer dispensing nozzle 118 may be configured to be disposed in fluid communication with the liquid hand sanitizer 160 in the sanitizer cartridge 158 according to any technique which is suitable for the purpose. For example and without limitation, in some embodiments, the sanitizer dispensing nozzle 118 may have an interior nozzle segment (not illustrated) which extends or protrudes into the cartridge compartment 114 in the dispenser housing 102. The interior nozzle segment may have a sharpened tip which pierces and extends into the sanitizer cartridge 158 as the sanitizer cartridge 158 is placed into the cartridge compartment 114.

In some embodiments, the sanitizer cartridge 158 may be disposable. In other embodiments, the sanitizer cartridge 158 may be refillable or recyclable according to the knowledge of those skilled in the art.

The dispenser housing 102 may have any design or shape which is consistent with the functional requirements of the sanitizer dispenser 100. Accordingly, in some embodiments, the dispenser housing 102 may include a front housing wall 104 and a rear housing wall 106. A pair of side housing walls 108, a top housing wall 110 and a bottom housing wall 112 may extend between the front housing wall 104 and the rear housing wall 106. The cartridge compartment 114 (FIG. 7) may be formed by and between the front housing wall 104, the rear housing wall 106, the side housing walls 108, the top housing wall 110 and the bottom housing wall 112.

In some embodiments, the sanitizer dispensing nozzle 118 may extend from the front housing wall 104 of the dispenser housing 102. Accordingly, as illustrated in FIG. 3, in fastening of the sanitizer dispenser 100 on the wrist 164 of the wearer, the sanitizer dispensing nozzle 118 may be disposed in alignment with the palm 166 on the hand of the wearer.

In some embodiments, the button opening 116 may be provided in the top housing wall 110 of the dispenser housing 102. The securing device connectors 134 may extend from the respective side housing walls 108 of the dispenser housing 102.

As illustrated in FIG. 2, in some embodiments, the sanitizer cartridge 158 may be disposable and removably placed in the cartridge compartment 114 of the dispenser housing 102. Accordingly, at least one cartridge access opening 152 may be provided in the dispenser housing 102, such as in the rear housing wall 106. The sanitizer cartridge 158 may be placed in the cartridge compartment 114 through the cartridge access opening 152. A cover 154 may be provided on the dispenser housing 102. The cover 154 may be configured to selectively close the cartridge access opening 152.

As illustrated in FIGS. 1 and 3-6, in some embodiments, at least one lamp 170 may be provided on the dispenser housing 102. In some embodiments, the lamp 170 may include at least one LED, for example and without limitation. The lamp 170 may be suitably configured and positioned to facilitate illumination of the palm 166 on the hand of the wearer. In some embodiments, the lamp 170 may be provided on the front housing wall 104 of the dispenser housing 102, typically adjacent to the sanitizer dispensing nozzle 118. The lamp 170 may be configured to be actuated responsive to depression of the sanitizer dispensing button 126, according to the knowledge of those skilled in the art. Alternatively, a separate lamp actuating button or other control (not illustrated) may be provided on the dispenser housing 102 and operably connected to the lamp 170 to energize the lamp 170 as needed.

In typical application of the sanitizer dispenser 100, a sanitizer cartridge 158 may be placed typically on the cartridge support pedestal 122 (FIG. 7) in the cartridge compartment 114 of the dispenser housing 102, in fluid communication with the sanitizer dispensing nozzle 118. Accordingly, as illustrated in FIG. 2, the cover 154 may initially be opened to expose the cartridge compartment 114 through the cartridge access opening 152. As the sanitizer cartridge 158 is placed on the cartridge support pedestal 122, the interior nozzle segment (not illustrated) of the sanitizer dispensing nozzle 118 may puncture and extend into the sanitizer cartridge 158 such that the sanitizer dispensing nozzle 118 is disposed in fluid communication with the liquid hand sanitizer 160 in the sanitizer cartridge 158.

As illustrated in FIG. 3, the sanitizer dispenser 100 may be deployed in place on the wrist 164 of the wearer with the sanitizer dispensing nozzle 118 aligned with the palm 166. The securing device 134 may then be fastened.

As illustrated in FIG. 4, when he or she desires to sanitize his or her hands, such as after shaking the hands of another person, for example and without limitation, the wearer may discreetly depress the head portion 128 of the sanitizer dispensing button 126 on the dispenser housing 102, typically using the opposite hand 168. Accordingly, as illustrated in FIG. 7, the protruding actuating portion 130 of the sanitizer dispensing button 126 may press against the sanitizer cartridge 158. This action may force or expel the liquid hand sanitizer 160 from the sanitizer cartridge 158 through the sanitizer dispensing nozzle 118 and onto the wearer's palm 166, as illustrated in FIG. 4. As illustrated in FIG. 4, in some applications, the lamp 170 may simultaneously be actuated to illuminate the palm 166 as the liquid hand sanitizer 160 is dispensed onto the palm 166. The wearer may then rub the hands together to spread the dispensed liquid hand sanitizer 160 over the hands to sanitize the hands.

After the capacity of the sanitizer cartridge 158 is exhausted and no longer contains the liquid hand sanitizer 160, typically after prolonged use, the emptied sanitizer cartridge 158 may be removed from the cartridge compartment 114, typically by opening of the cover 154 (FIG. 2) and removing the emptied sanitizer cartridge 158 from the cartridge compartment 114. A replacement sanitizer cartridge 158 may subsequently be placed in the cartridge compartment 114 and the cover 154 closed for continued use of the sanitary dispenser 100. The emptied sanitizer cartridge 158 may be discarded or refilled and reused.

Referring next to FIGS. 8-9, 10A-C, 11, 12A-C, 13A-C, and 14-15, a wearable hand sanitizer dispenser 200 is shown in accordance with a second illustrative embodiment of the invention. Reference numerals which correspond to like elements of the wearable hand sanitizer dispenser 100 heretofore described with respect to FIGS. 1-7 are designated by the same reference numerals in the 200-299 series in FIGS. FIGS. 8-9, 10A-C, 11, 12A-C, 13A-C, and 14-15.

Figure 8:
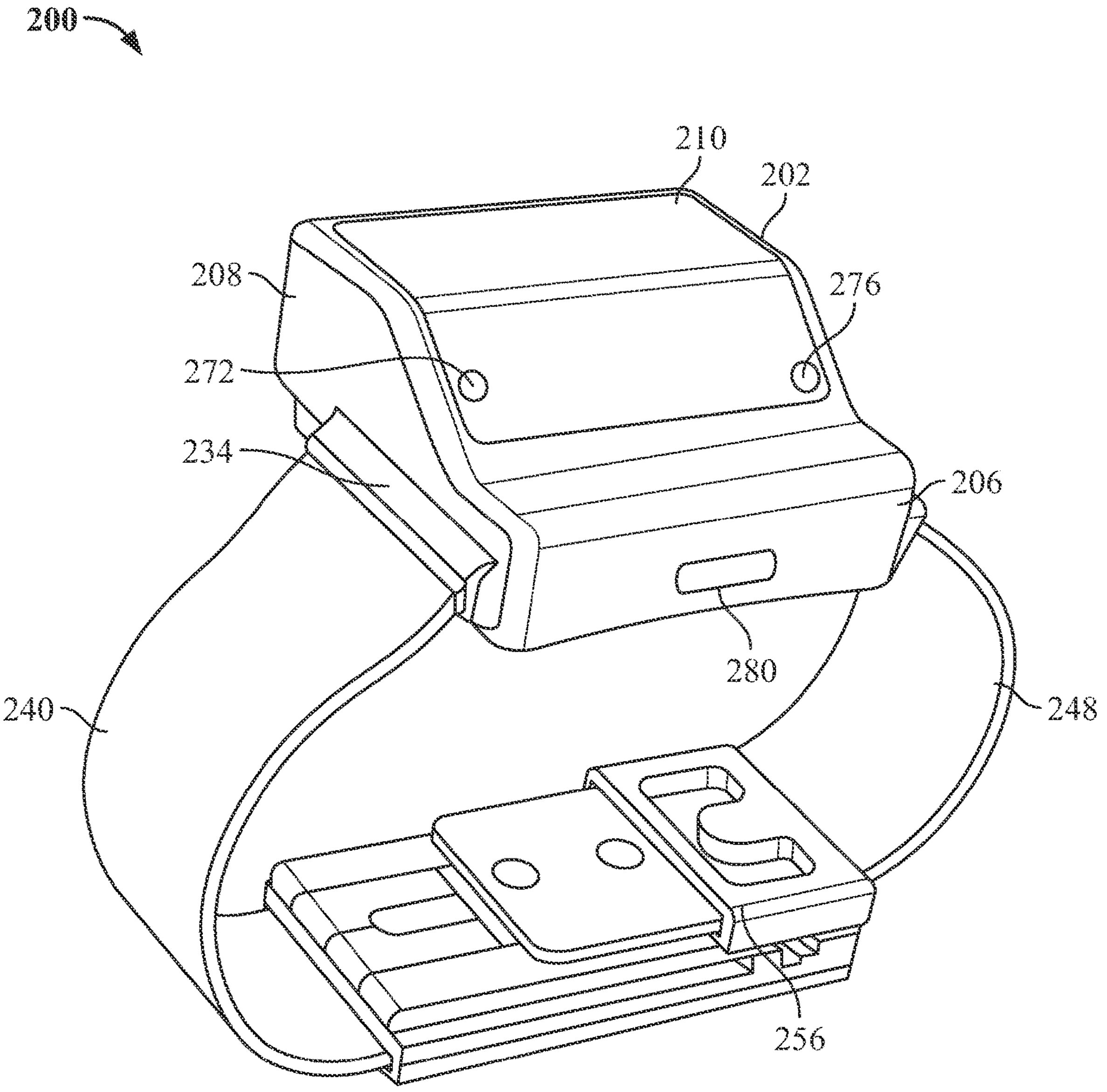
FIG. 8 is a top left rear perspective view of a wearable hand sanitizer dispenser in accordance with a second illustrative embodiment of the present invention.
Figure 9:
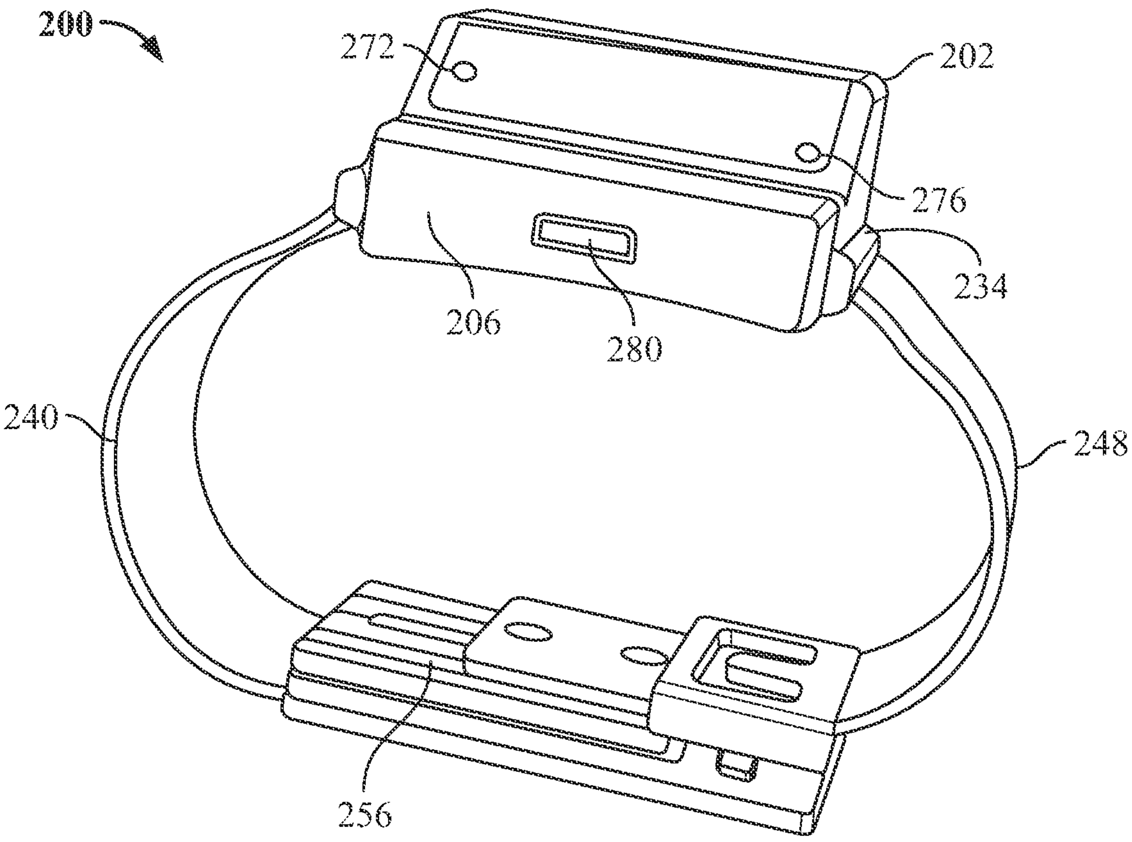
FIG. 9 is a top right rear perspective view of a wearable hand sanitizer dispenser as in FIG. 8.
Figure 10A:
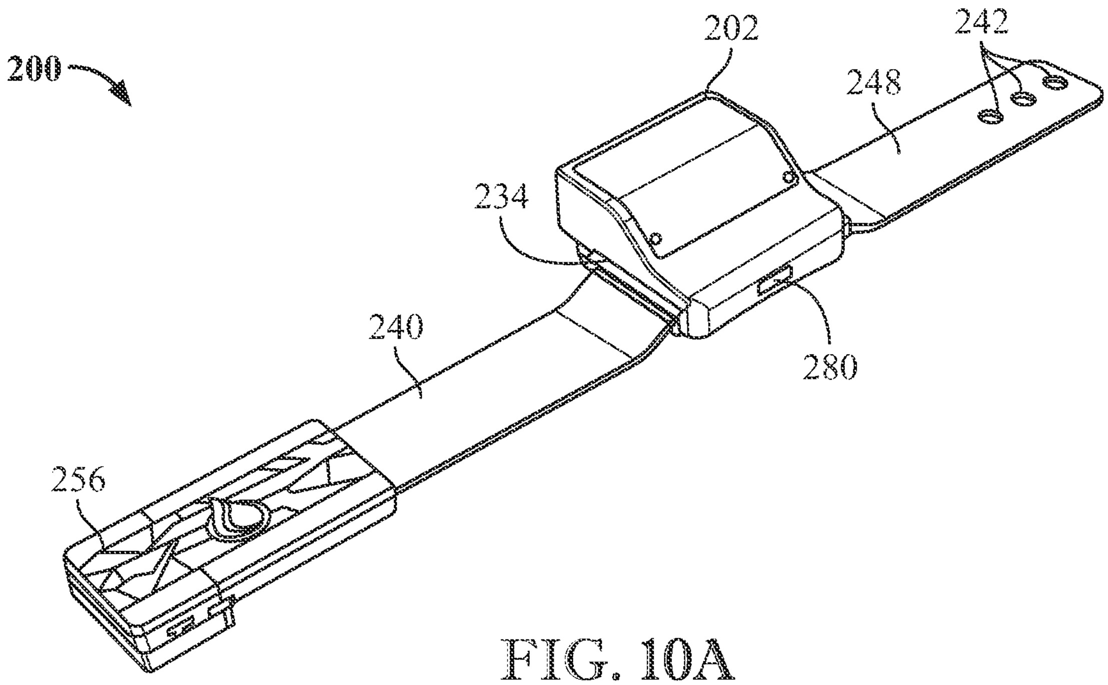
FIG. 10A is a top left rear perspective view of a wearable hand sanitizer dispenser as in FIG. 8.
Figure 10B:
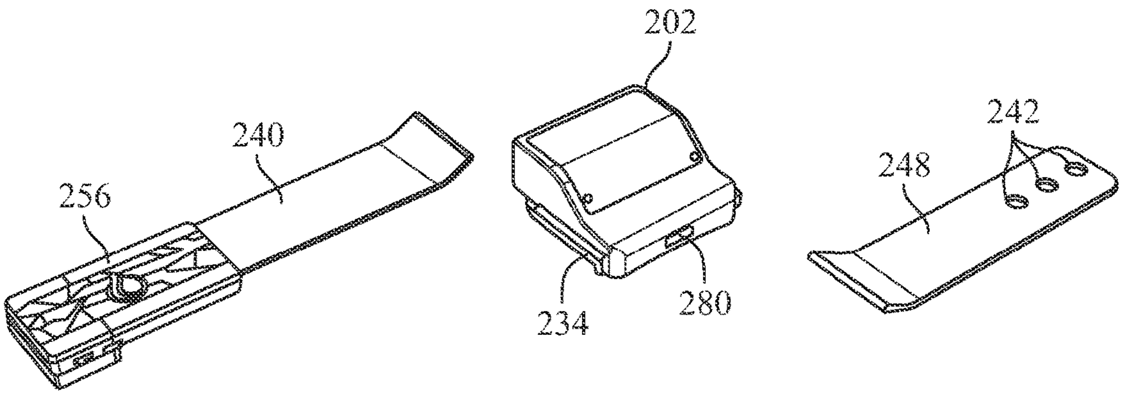
FIG. 10B is a top left rear exploded perspective view of a wearable hand sanitizer dispenser as in FIG. 10A with the 8.
Figure 10C:
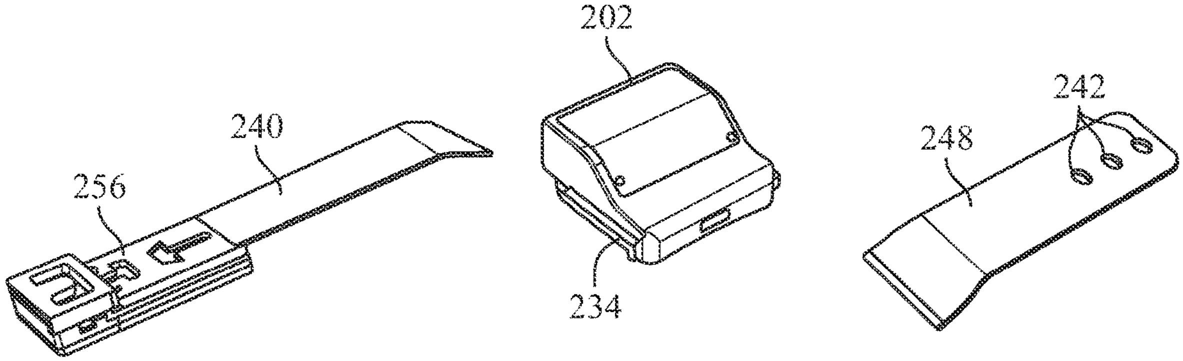
FIG. 10C is an exploded perspective view of a wearable hand sanitizer dispenser as in FIG. 10B with a partial top view and partial bottom view.
Figure 11:
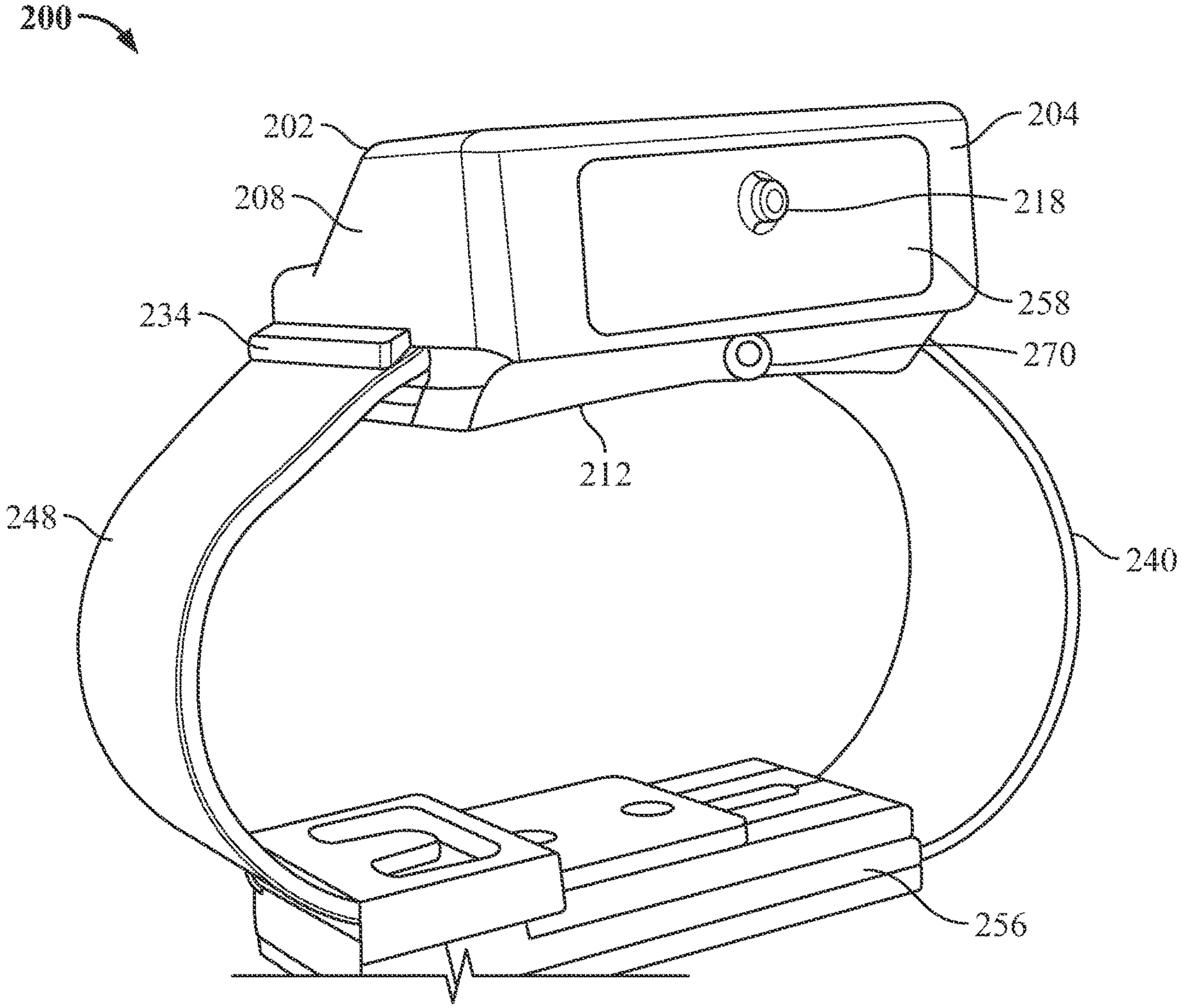
FIG. 11 is a bottom left perspective view of a wearable hand sanitizer dispenser as in FIG. 8.
Figure 12A:
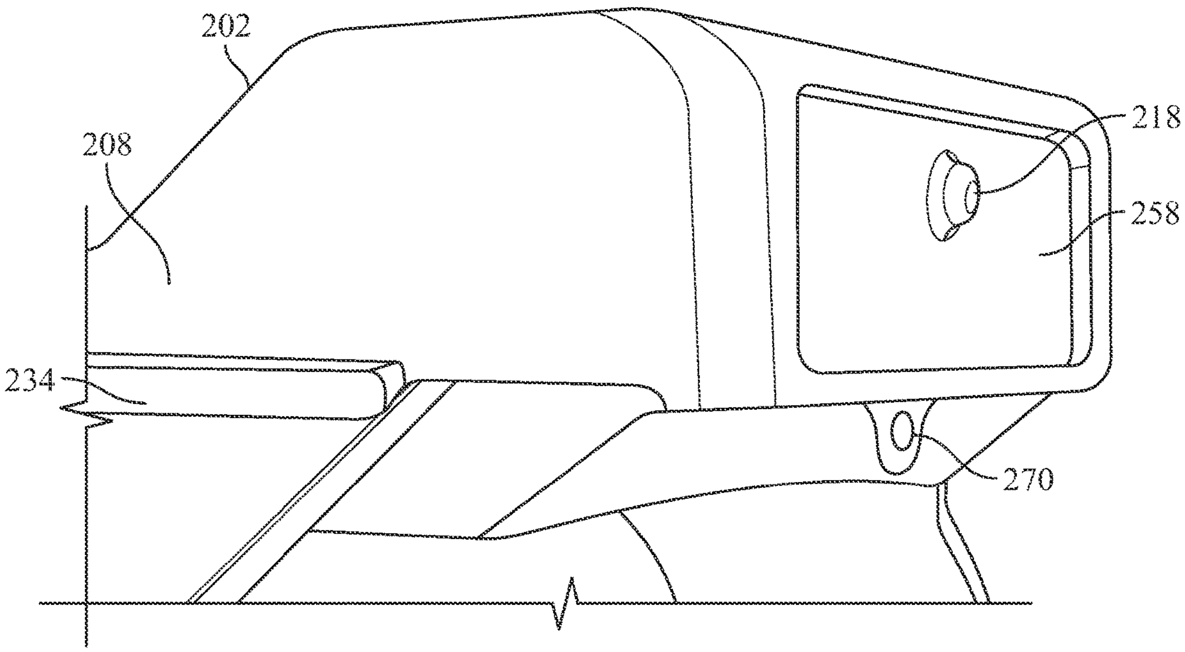
FIG. 12A is a partial front perspective view of a wearable hand sanitizer dispenser as in FIG. 8, enlarged to show detail.
Figure 12B:
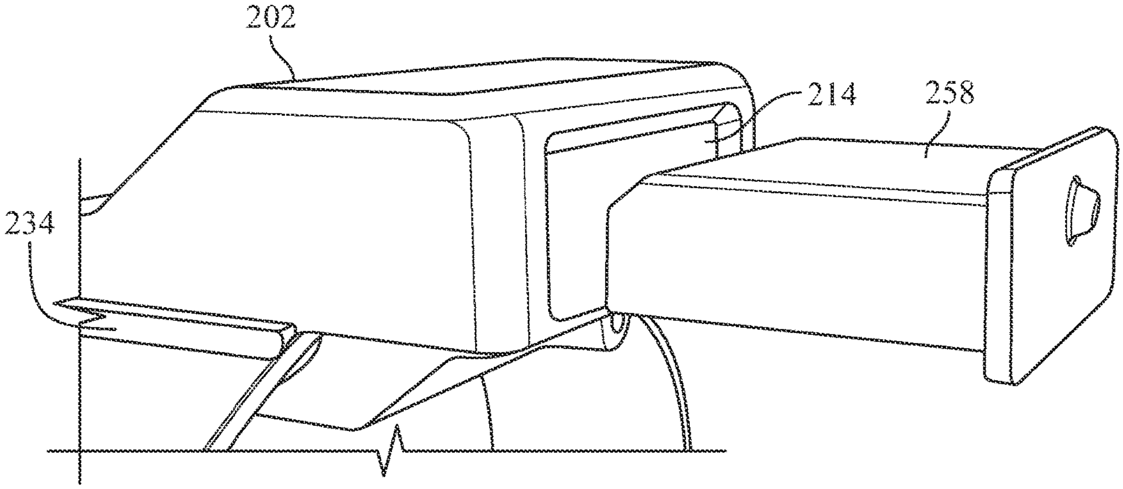
FIG. 12B is a partial front exploded perspective view of a wearable hand sanitizer dispenser as in FIG. 12A showing a sanitizer cartridge outside of the sanitizer housing.
Figure 12C:
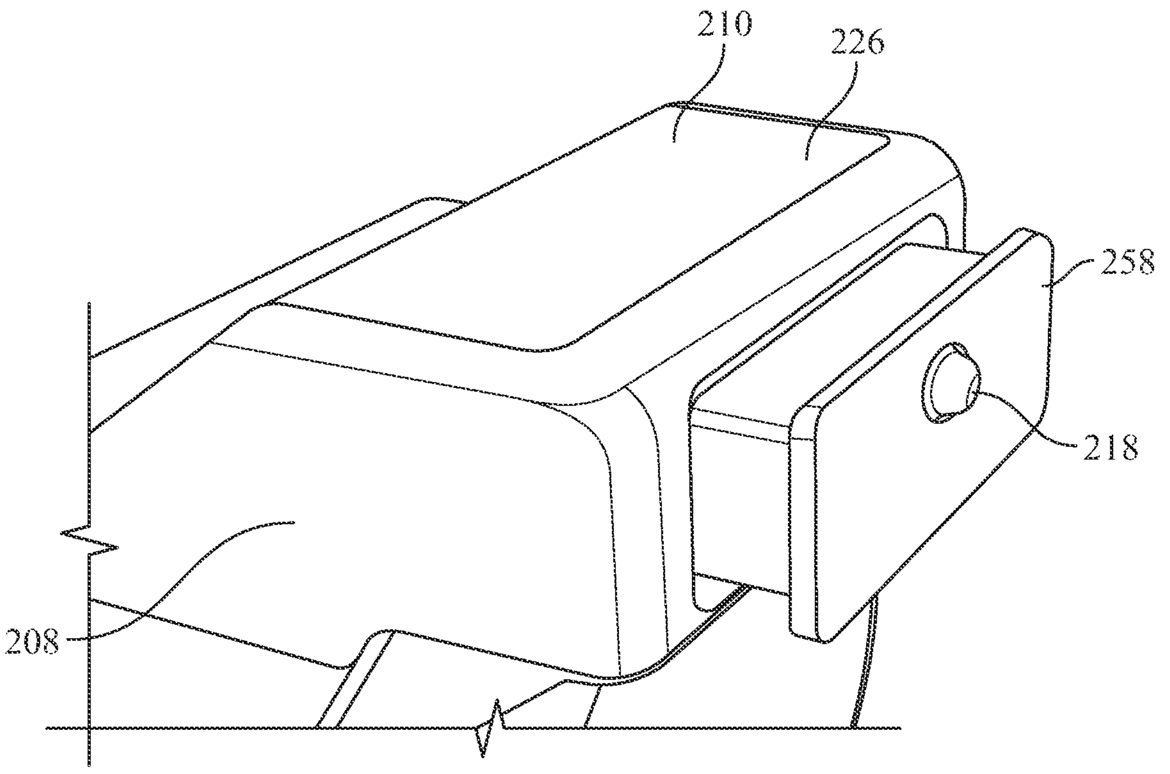
FIG. 12C is a partial front perspective view of a wearable hand sanitizer dispenser as in FIGS. 12A and 12B with the sanitizer cartridge partially removed from the sanitizer housing.
Figure 13A:
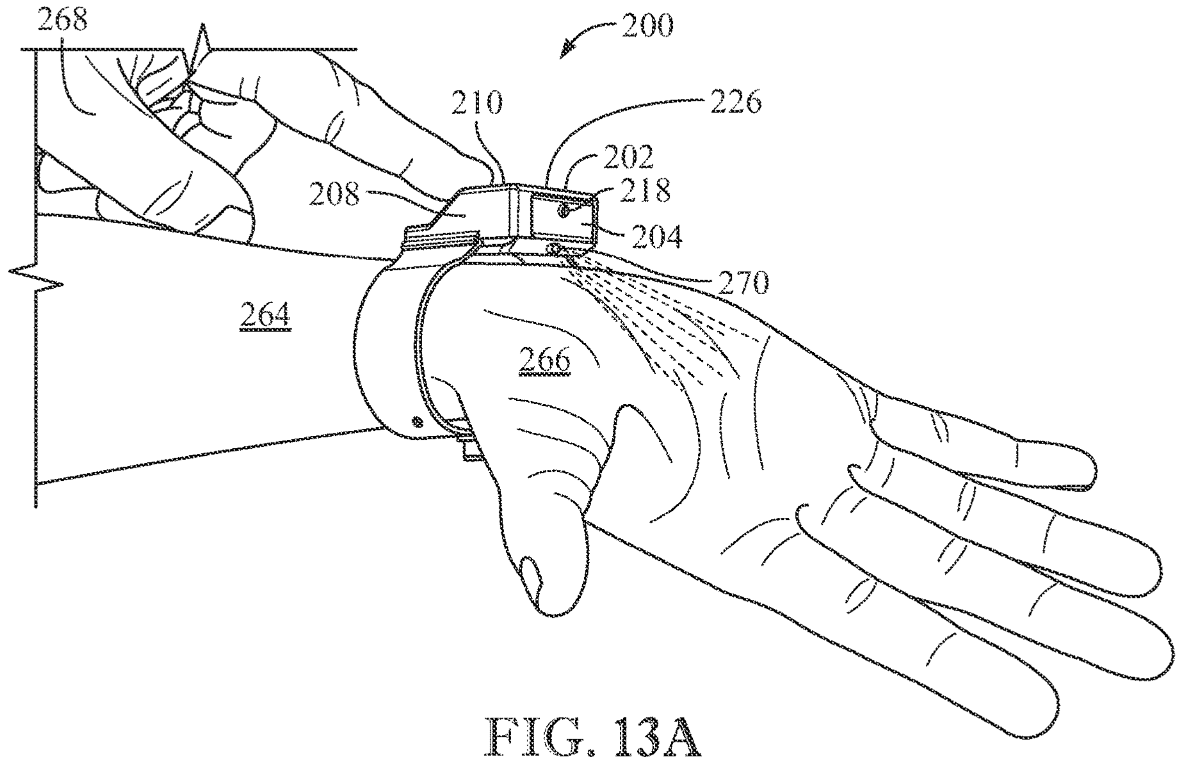
FIG. 13A presents a front perspective view of the wearable hand sanitizer dispenser as in FIG. 8 fastened on the wrist of a wearer in typical application of the dispenser and further illustrating actuation of the lamp thereof in connection with typical dispensing of the liquid hand sanitizer from the sanitizer dispensing nozzle.
Figure 13B:
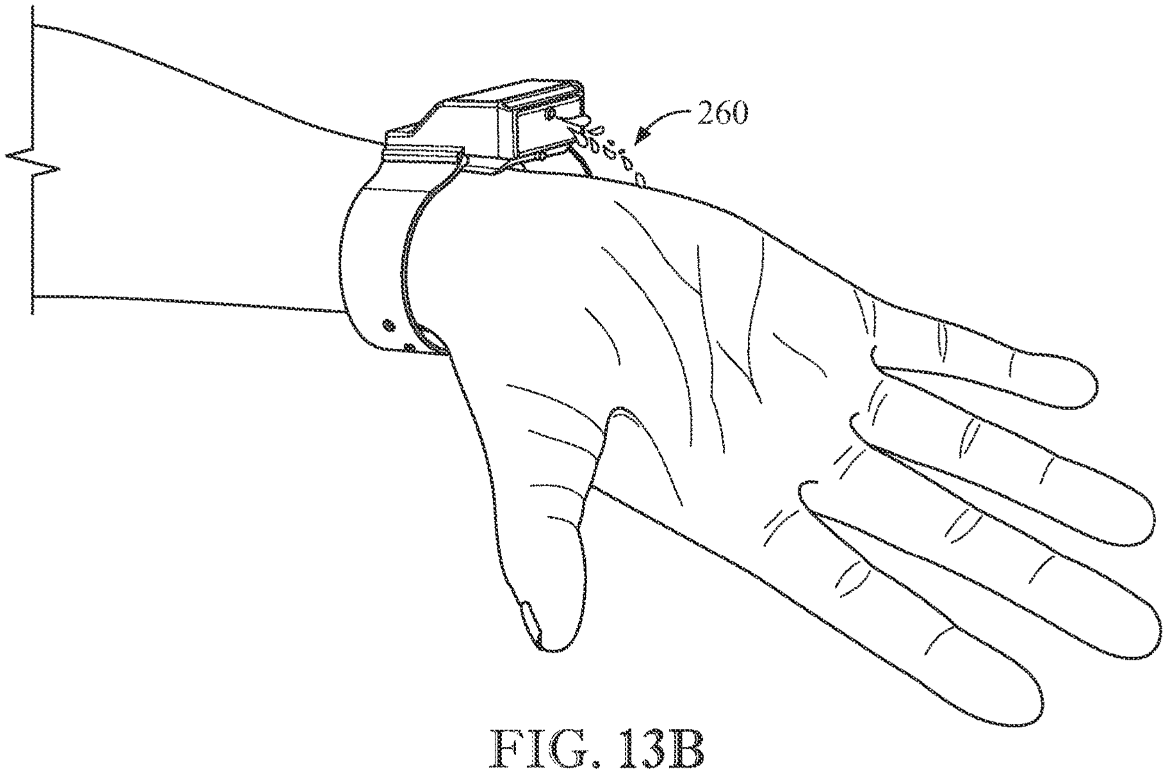
FIG. 13B presents a front perspective view of the wearable hand sanitizer dispenser as in FIG. 8 fastened on the wrist of a wearer in typical application of the dispenser and further illustrating typical dispensing of the liquid hand sanitizer from the sanitizer dispensing nozzle onto the palm of the wearer's hand.
Figure 13C:
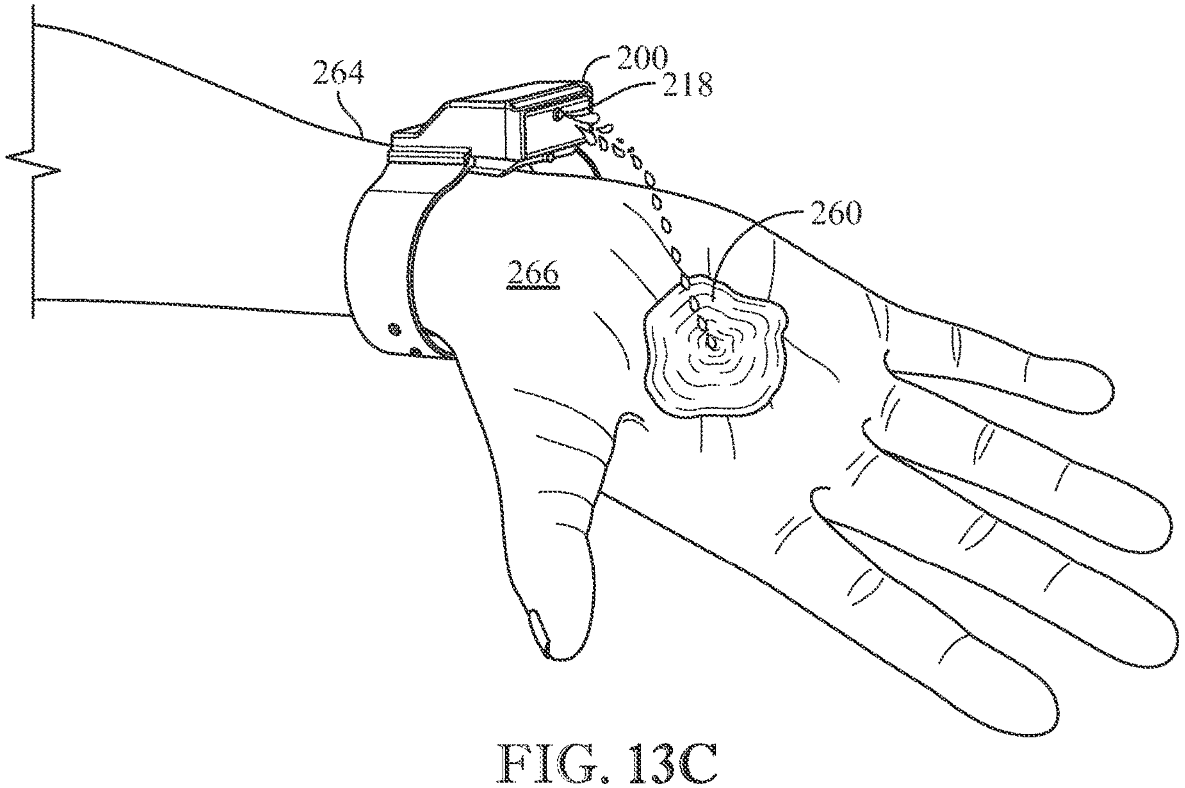
FIG. 13C presents a front perspective view of the wearable hand sanitizer dispenser as in FIG. 8 fastened on the wrist of a wearer in typical application of the dispenser and further illustrating the liquid hand sanitizer after dispensing from the sanitizer dispensing nozzle into the palm of the wearer's hand.
Figure 14:
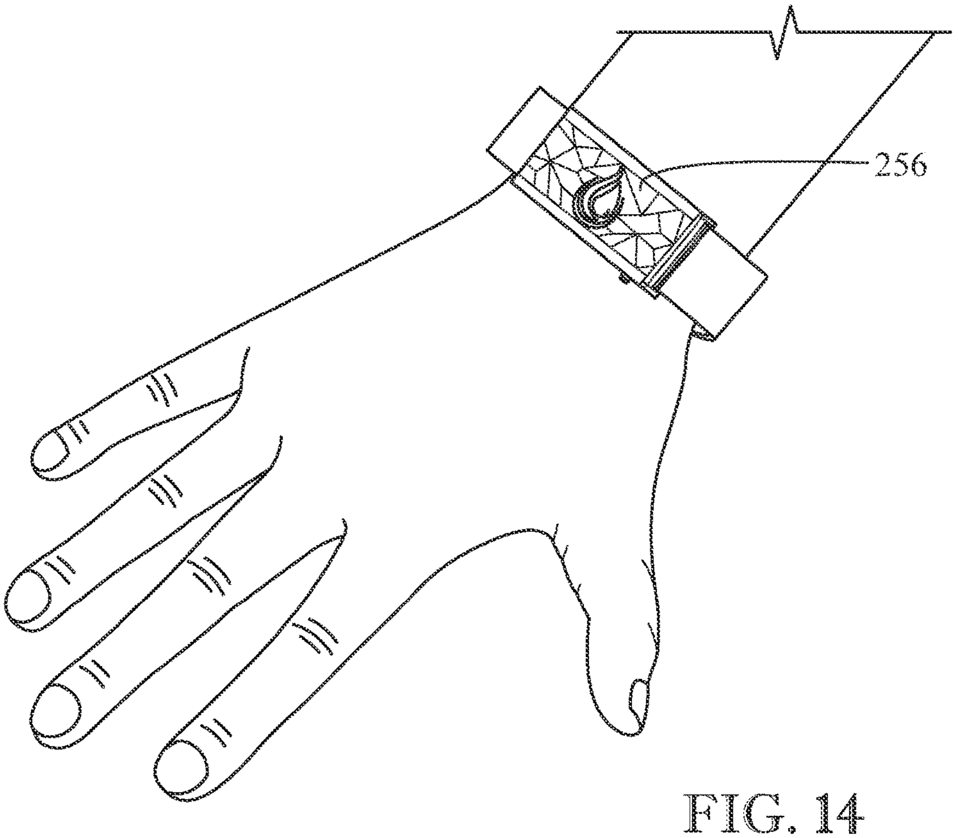
FIG. 14 is a perspective view of a wearable hand sanitizer dispenser on a wearer's wrist showing the clasp.

As shown at FIG. 8, the sanitizer dispenser 200 may include a dispenser housing 202. The dispenser housing 202 may be configured to contain a supply of liquid hand sanitizer 260 (best seen at FIGS. 13B-C). As illustrated in FIGS. 8-9, 10A-C, 11, 12A-C, 13A-C, and 14-15, though best seen at FIGS. 13A-C and FIG. 14, the dispenser housing 202 may be configured for attachment to the wrist 264 of a wearer. At least one sanitizer dispensing nozzle 218 may extend from the dispenser housing 202. As best seen at FIGS. 13A-C, the sanitizer dispensing nozzle 218 may be disposable in fluid communication with the liquid hand sanitizer 260 in the dispenser housing 202 and in positional alignment with the palm 266 on the hand of the wearer. Accordingly, the liquid hand sanitizer 260 can be selectively and discreetly dispensed from the dispenser housing 202 through the sanitizer dispensing nozzle 218 onto the palm 266 of the hand. The wearer may then rub the hands together to spread the dispensed liquid hand sanitizer 260 over the hands to sanitize the hands.

The dispenser housing 202 may have any design or shape which is consistent with the functional requirements of the sanitizer dispenser 200. The dispenser housing 202 may include a front housing wall 204 and a rear housing wall 206. A pair of side housing walls 208, a top housing wall 210 and a bottom housing wall 212 may extend between the front housing wall 204 and the rear housing wall 206. The cartridge compartment 214 may be formed by and between the front housing wall 204, the rear housing wall 206, the side housing walls 208, the top housing wall 210 and the bottom housing wall 212.

As best seen in FIGS. 12A-C and 13A-C, in some embodiments, the liquid hand sanitizer 260 may be contained in at least one sanitizer cartridge 258. A cartridge compartment 214 may be provided in the dispenser housing 202. The cartridge compartment 214 may be configured to removably contain the sanitizer cartridge 258. The sanitizer cartridge 258 may be configured to be in fluid communication with the sanitizer dispensing nozzle 218. The sanitizer cartridge 258 may be disposable and removably placed in the cartridge compartment 214 of the dispenser housing 202. Accordingly, at least one cartridge access opening 252 may be provided in the dispenser housing 202. The sanitizer cartridge 258 may be placed in the cartridge compartment 214 through the cartridge access opening 252. In some embodiments, the sanitizer dispensing nozzle 218 may be integral with the sanitizer cartridge 258. In some embodiments, the cartridge compartment 214 may be closed by the sanitizer cartridge 258 when the sanitizer cartridge is removably installed therein in a manner similar to a furniture drawer.

In some embodiments, at least one sanitizer dispensing button 226 may be provided on the dispenser housing 202. In some embodiments, the sanitizer dispensing button 226 may be provided in the top housing wall 110 of the dispenser housing 102. The sanitizer dispensing button 226 may be configured to dispense the liquid hand sanitizer 260 from the sanitizer cartridge 258 through the sanitizer dispensing nozzle 218, typically in a manner described herein. In some embodiments, the sanitizer dispensing button 226 may include an actuating portion 230 configured to engage the sanitizer cartridge 258 to eject the liquid hand sanitizer 260 from the sanitizer cartridge 258 typically by manual depression as described herein, or by actuation of a touch screen.

The sanitizer dispensing nozzle 218 may be configured to be disposed in fluid communication with the liquid hand sanitizer 260 in the sanitizer cartridge 258 according to any technique which is suitable for the purpose. In some embodiments, the sanitizer cartridge 258 may be disposable. In other embodiments, the sanitizer cartridge 258 may be refillable or recyclable according to the knowledge of those skilled in the art.

In some embodiments, the sanitizer dispensing nozzle 218 may extend from the front housing wall 204 of the dispenser housing 202. Accordingly, as is best seen at FIGS. 13A-C, in fastening of the sanitizer dispenser 200 on the wrist 264 of the wearer, the sanitizer dispensing nozzle 218 may be disposed in alignment with the palm 266 on the hand of the wearer. The sanitizer dispenser 200 may be deployed in place on the wrist 264 of the wearer with the sanitizer dispensing nozzle 218 aligned with the palm 266. The securing device 234 may then be fastened. When a user desires to sanitize his or her hands, such as, for example without limitation, after shaking the hands of another person, the wearer may discreetly actuate the sanitizer dispensing button 226 on the dispenser housing, typically using the opposite hand 268. The sanitizer dispensing button 226 is operably connected to the sanitizer cartridge 258 so that actuation of the dispensing button may force or expel the liquid hand sanitizer 260 from the sanitizer cartridge 258 through the sanitizer dispensing nozzle 218 and onto the wearer's palm 266. In some applications, the lamp 270 may simultaneously be actuated to illuminate the palm 266 as the liquid hand sanitizer 260 is dispensed onto the palm 266. The wearer may then rub the hands together to spread the dispensed liquid hand sanitizer 260 over the hands to sanitize the hands.

After the capacity of the sanitizer cartridge 258 is exhausted and no longer contains the liquid hand sanitizer 260, typically after prolonged use, the emptied sanitizer cartridge 258 may be removed from the cartridge compartment 214, and a replacement sanitizer cartridge 258 may subsequently be placed in the cartridge compartment 214 for continued use of the hand sanitizer dispenser 200. Removal and replacement of the sanitizer cartridge 258 is best seen at FIGS. 12A-C. The emptied sanitizer cartridge 258 may be discarded or refilled and reused.

As indicated herein, at least one lamp 270 may be provided on the dispenser housing 202. In some embodiments, the lamp 270 may include at least one LED, for example and without limitation. The lamp 270 may be suitably configured and positioned to facilitate illumination of the palm 266 on the hand of the wearer. In some embodiments, the lamp 270 may be provided on the front housing wall 204 of the dispenser housing 202, typically adjacent to the sanitizer dispensing nozzle 218. The lamp 270 may be configured to be actuated responsive to depression of the sanitizer dispensing button 226, according to the knowledge of those skilled in the art. Alternatively, a separate lamp actuating button or other control (not illustrated) may be provided on the dispenser housing 202 and operably connected to the lamp 270 to energize the lamp 270 as needed.

The lamp may be battery-operated, by a replaceable disposable or rechargeable battery (not shown) held within the housing 202. The battery may be recharged by a USB cord (not shown) capable of being plugged into a USB port 280 operably connected to the battery in the housing 202. In some embodiments, the USB port 280 may be provided in the rear housing wall 206 as is shown at FIGS. 8-9 and 10A-C. The USB port 280 may be provided in any suitable location anywhere on housing 202.

In some embodiments, in addition to the LED lamp 270, additional battery powered LED lights may be provided on the housing. Referring to FIGS. 8-9 and 10A-C, a battery level indicator LED lamp 272 may be provided which indicates the state of the battery, and whether the battery needs to be recharged or replaced. A cartridge level LED lamp 276 may be provided which may indicate the cartridge needs to be refilled or replaced.

Figure 15:
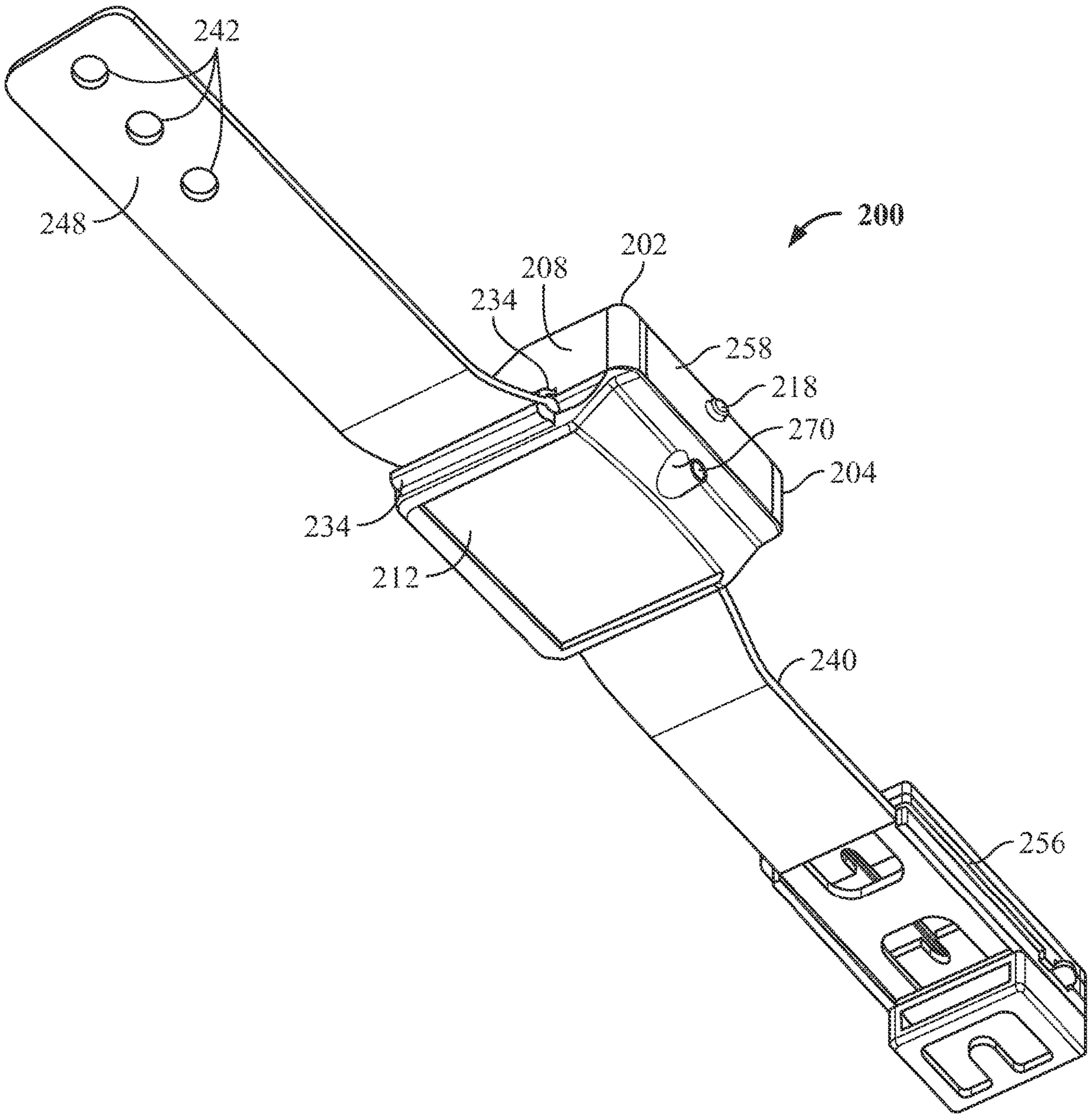
FIG. 15 is a bottom left front perspective view of a wearable hand sanitizer dispenser as in FIG. 8.

As shown throughout FIGS. 8-9, 10A-C, 11, 12A-C, 13A-C, and 14-15, but best seen at FIGS. 10A-C and 15, the securing device 238 is provided to facilitate fastening or securing of the dispenser housing 202 on the wrist 264 (as shown at FIGS. 13A-C and 14). The securing device may be fabricated in various sizes. The securing device 238 may include a first securing strap 240 and a second securing strap 248. The first securing strap 240 and the second securing strap 248 may be attached to the respective securing device connectors 234 which extend from the dispenser housing 202. The securing device connector structure is best seen at FIG. 15. The first and second securing straps 240,248 may be removably attached to the securing device connectors 234, and may be fabricated in various sizes. For example and without limitation, the first securing strap 240 and the second securing strap 248 may be provided in varying sizes, such as, for example without limitation, men's size, women's size, and children's size. The securing device may further comprise a clasp 256 configured to secure the first securing strap 240 and the second securing strap 248 together. The clasp is best seen closed on a wearer's wrist in FIG. 14.

The wearable hand sanitizer dispenser and its components may be made of any suitable material, by any suitable fabrication process. The material may be a light yet durable material which may be comfortably worn on a wearer's wrist as one would wear a piece of jewelry, which would complement a wearer's wrist, like a bracelet or a wristwatch.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A wearable hand sanitizer dispenser wearable on a wrist of a wearer and capable of being selectively actuated by the wearer to discreetly dispense a liquid hand sanitizer onto a palm of a hand of the wearer, the wearable hand sanitizer dispenser comprising:

a dispenser housing configured to contain a supply of liquid hand sanitizer, the dispenser housing having a front housing wall, a rear housing wall and a pair of side housing walls, and further including a top housing wall and a bottom housing wall which extend between the front housing wall and the rear housing wall, the dispenser housing being configured for attachment to the wrist of the wearer, the dispenser housing further comprising an interior cartridge compartment configured to removably contain the at least one sanitizer cartridge; and at least one sanitizer dispensing nozzle extending from the dispenser housing, the sanitizer dispensing nozzle being disposable in fluid communication with the supply of liquid hand sanitizer in the dispenser housing and with the at least one sanitizer cartridge, and in positional alignment with the palm of the hand of the wearer while the dispenser housing is attached to the wearer's wrist;

at least one sanitizer dispensing button located on the dispenser housing and configured for actuation by the wearer to dispense the liquid hand sanitizer from the at least one sanitizer cartridge through the at least one sanitizer dispensing nozzle;

a battery-operated touch screen provided on the top housing wall of the dispenser housing; and a battery power source;

wherein the at least one sanitizer dispensing button is located on the battery-operated touch screen; and wherein the liquid hand sanitizer can be selectively and discreetly dispensed from the dispenser housing and the at least one sanitizer cartridge through the sanitizer dispensing nozzle onto the palm of the hand of the wearer in response to actuation of the hand sanitizer dispenser by the wearer by actuation of the at least one sanitizer dispensing button, for use by the wearer to sanitize the hands of the wearer, so the wearer may rub the hands together to spread the dispensed liquid hand sanitizer over the hands to sanitize the hands.

2. The wearable hand sanitizer dispenser of claim 1 wherein the at least one sanitizer dispensing nozzle extends from the front housing wall of the dispenser housing.

3. The wearable hand sanitizer dispenser of claim 1 wherein:

the dispenser housing further comprises at least one cartridge access opening provided in the dispenser housing; and the at least one sanitizer cartridge may be placed in the cartridge compartment through the cartridge access opening.

4. The wearable hand sanitizer dispenser of claim 1 wherein the at least one sanitizer cartridge is refillable.

5. The wearable hand sanitizer dispenser of claim 1 wherein the at least one sanitizer cartridge is disposable.

6. The wearable hand sanitizer dispenser of claim 1 wherein the at least one sanitizer cartridge is recyclable.

7. The wearable hand sanitizer dispenser of claim 1 further comprising at least one securing device configured to secure the dispenser housing on the wrist of the wearer.

8. The wearable hand sanitizer dispenser of claim 1 further comprising a pair of spaced-apart securing device connectors extending from the dispenser housing, and wherein the at least one securing device extends from the securing device connectors.

9. The wearable hand sanitizer dispenser of claim 8 wherein the pair of spaced-apart securing device connectors extending from the dispenser housing further comprise a first securing device connector and a second securing device connector;

the pair of side housing walls further comprises a first side housing wall and a second side housing wall;

the first securing device connector and the second securing device connector respectively extend from the first side housing wall and the second side housing wall; and the at least one securing device comprises a first securing device attached to the first securing device connector and a second securing device attached to the second securing device connector.

10. The wearable hand sanitizer dispenser of claim 9 wherein the at least one securing device comprises a first securing strap and a second securing strap releasably securable to the first securing strap.

11. The wearable hand sanitizer dispenser of claim 10 further comprising a plurality of strap openings extending through the first securing strap.

12. The wearable hand sanitizer dispenser of claim 11 further comprising a strap clamp located at distal end of the second securing strap.

13. The wearable hand sanitizer dispenser of claim 1, further comprising at least one lamp provided on the dispenser housing to facilitate illumination of the palm of the wearer, wherein the at least one lamp is actuated by the at least one sanitizer dispensing button.

14. The wearable hand sanitizer dispenser of claim 1 further comprising a battery level indicator LED lamp located on the dispenser housing, and a cartridge level indicator LED lamp located on the dispenser housing.

15. The wearable hand sanitizer dispenser of claim 14 wherein the battery power source is a rechargeable battery located in the dispenser housing.

16. The wearable hand sanitizer dispenser of claim 15 further comprising a USB port operably connected to the rechargeable battery.

17. The wearable hand sanitizer of claim 16 wherein the USB port is located at the rear housing wall of the dispenser housing.

* * * * *